(12) United States Patent
Sun et al.

(10) Patent No.: US 12,438,801 B2
(45) Date of Patent: Oct. 7, 2025

(54) ROUTING INFORMATION TRANSMISSION METHOD AND APPARATUS, AND DATA CENTER INTERCONNECTION NETWORK

(71) Applicant: Huawei Technologies Co., Ltd., Shenzhen (CN)

(72) Inventors: Yuezhuo Sun, Nanjing (CN); Ying Xie, Shenzhen (CN); Yuan Gao, Nanjing (CN)

(73) Assignee: HUAWEI TECNOLOGIES CO., LTD., Shenzhen (CN)

( * ) Notice: Subject to any disclaimer, the term of this patent is extended or adjusted under 35 U.S.C. 154(b) by 521 days.

(21) Appl. No.: 17/731,917

(22) Filed: Apr. 28, 2022

(65) Prior Publication Data

US 2022/0255837 A1    Aug. 11, 2022

Related U.S. Application Data

(63) Continuation of application No. PCT/CN2020/116457, filed on Sep. 21, 2020.

(30) Foreign Application Priority Data

Oct. 30, 2019    (CN) .......................... 201911048108.7

(51) Int. Cl.
*H04L 45/02* (2022.01)
*H04L 12/46* (2006.01)
*H04L 45/76* (2022.01)

(52) U.S. Cl.
CPC .......... *H04L 45/02* (2013.01); *H04L 12/4633* (2013.01); *H04L 12/4641* (2013.01); *H04L 45/76* (2022.05)

(58) Field of Classification Search
None
See application file for complete search history.

(56) References Cited

U.S. PATENT DOCUMENTS 10,243,834 B1 *  3/2019  Shekhar .................. H04L 45/64
10,419,328 B1 *  9/2019  Dave ...................... H04L 45/24
(Continued)

FOREIGN PATENT DOCUMENTS

CN      102510404 A      6/2012
CN      106878136 A  *   6/2017  ......... H04L 12/4641
(Continued)

OTHER PUBLICATIONS

Sajassi, Ed. et al. Integrated Routing and Bridging in EVPN, Mar. 4, 2019, IETF (Year: 2019).*
(Continued)

*Primary Examiner* — Luna Weissberger
(74) *Attorney, Agent, or Firm* — Conley Rose, P.C.

(57) ABSTRACT

A first data center interconnection (DCI) device in a first data center receives a first packet from a Border Gateway Protocol Ethernet virtual private network (BGP EVPN) neighbor, where the first packet includes routing information of a first forwarding instance of an access device in the first data center and an export route target of the first forwarding instance. The first DCI device obtains a second forwarding instance that corresponds to the first packet, where an import route target of the second forwarding instance matches the export route target of the first forwarding instance. The first DCI device generates a second packet that includes routing information of the second forwarding instance and an export route target of the second forwarding instance, which includes a DCI interworking route target. The first DCI device sends the second packet to a second DCI device in a second data center.

20 Claims, 7 Drawing Sheets

(56) References Cited

U.S. PATENT DOCUMENTS

2010/0329265 A1    12/2010  Lapuh et al.
2014/0052876 A1*    2/2014  Zeng ................... H04L 45/02
                                                        709/245
2016/0134526 A1*    5/2016  Maino ................ G06F 9/45558
                                                        709/226

FOREIGN PATENT DOCUMENTS

| CN | 107787571 A | 3/2018 |
| CN | 108512737 A | 9/2018 |
| CN | 109728926 A | 5/2019 |
| CN | 107018076 A | 7/2019 |
| WO | 2019164907 A1 | 8/2019 |

OTHER PUBLICATIONS

Sajassi, Ed et al. Integrated Routing and Bridging in EVPN, IETF (Year: 2019).*

Sajassi, A., Ed., et al., "Integrated Routing and Bridging in EVPN," draft-ietf-bess-evpn-inter-subnet-forwarding-04, Jul. 2, 2018, 34 pages.

* cited by examiner

ROUTING INFORMATION TRANSMISSION METHOD AND APPARATUS, AND DATA CENTER INTERCONNECTION NETWORK

CROSS-REFERENCE TO RELATED APPLICATIONS

This application is a continuation of International Patent Application No. PCT/CN2020/116457, filed on Sep. 21, 2020, which claims priority to Chinese Patent Application No. 201911048108.7, filed on Oct. 30, 2019. The disclosures of the aforementioned applications are hereby incorporated by reference in their entireties.

TECHNICAL FIELD

This application relates to the field of network technologies, and in particular, to a routing information transmission method and apparatus, and a data center interconnection network.

BACKGROUND

To meet scenarios such as cross-regional operation, user access, and remote disaster recovery, a current enterprise usually deploys a plurality of data centers in a plurality of regions. To implement communication between virtual machines (VM) in different data centers, a data center (DC) interconnection (DCI) solution is proposed. Currently, data center interconnection may be implemented by using end-to-end virtual extensible local area network (VXLAN), virtual local area network (VLAN) hand-off, or a segment VXLAN.

Implementing data center interconnection by using the segment VXLAN means that a segment of VXLAN tunnel is established in each of two data centers, and another segment of VXLAN tunnel is established between the two data centers. Two VXLAN tunnel end points (VTEPs) of the VXLAN tunnel inside the data center are respectively disposed on an access device (which is a switch connected to a server, and may be referred to as a server-leaf) and a DCI device (which is a switch that is used as an edge device of the data center and that is connected to another data center, and may be referred to as a DCI-leaf) of the data center. That is, a Border Gateway Protocol (BGP) Ethernet virtual private network (EVPN) peer-to-peer relationship is established between the access device and the DCI device of the data center. Two VTEPs of the VXLAN tunnel between the two data centers are respectively disposed on DCI devices of the two data centers. That is, a BGP EVPN peer-to-peer relationship is established between the DCI devices of the two data centers. After receiving routing information sent by an access device of a data center, a DCI device of the data center transmits the received routing information to a DCI device of another data center.

However, because the routing information sent by the access device to the DCI device may not be used for DCI forwarding, and the DCI device sends all the received routing information to the peer DCI device, not only transmission resources are wasted, but also memory resources and computing resources of the peer DCI device are wasted.

SUMMARY

This application provides a routing information transmission method and apparatus, and a data center interconnection network, to resolve a problem that currently in a routing information transmission process, transmission resources are wasted, and memory resources and computing resources of a peer DCI device are wasted.

According to a first aspect, a routing information transmission method is provided, and the method is applied to a DCI network. A first DCI device in a first data center receives a first packet from a BGP EVPN neighbor that is of the first DCI device and that is in the first data center, where the first packet includes routing information of a first forwarding instance of an access device in the first data center and an export route target of the first forwarding instance. The first DCI device obtains a second forwarding instance that corresponds to the first packet and that is in the first DCI device, where an import route target of the second forwarding instance matches the export route target of the first forwarding instance. The first DCI device generates a second packet based on the first packet, where the second packet includes routing information of the second forwarding instance and an export route target of the second forwarding instance. When the export route target of the second forwarding instance includes a DCI interworking route target, the first DCI device sends the second packet to the second DCI device in the second data center, and the second DCI device is a BGP EVPN neighbor of the first DCI device.

When the export route target of the second forwarding instance includes the DCI interworking route target, the second forwarding instance is a DCI interworking instance in the first DCI device.

In this application, the DCI interworking instance is pre-planned in the first DCI device, and the DCI interworking route target is identified in configuration information of the first DCI device, so that the first DCI device sends a packet including the DCI interworking route target only to the second DCI device, to implement routing information filtering at a sending end. This cannot only prevent a plurality of groups of repeated routing information from being sent, but also prevent routing information transferred in the data center from being sent to another data center, thereby reducing waste of transmission resources and waste of memory resources and computing resources of the second DCI device.

Optionally, the export route target of the second forwarding instance further includes a local interworking route target. An implementation process in which the first DCI device sends the second packet to the second DCI device in the second data center may include:

After deleting the local interworking route target from the second packet, the first DCI device sends the second packet to the second DCI device.

In this application, because the packet sent by the first DCI device to the second DCI device carries only the DCI interworking route target in an export route target of the DCI interworking instance, incorrect routing may be avoided when an import route target of an intra-DC interworking instance of the second DCI device is the same as the local DCI interworking route target of the first data center, thereby ensuring network security.

Optionally, the first DCI device further generates a forwarding entry of the second forwarding instance based on the routing information of the first forwarding instance.

According to a second aspect, a routing information transmission method is provided, and the method is applied to a DCI network. A second DCI device in a second data center receives a first packet sent by a first DCI device in a first data center, where the first packet includes routing information of a first forwarding instance of the first DCI device and a DCI interworking route target in an export route target of the first forwarding instance, and the second DCI device is a BGP EVPN neighbor of the first DCI device. When an import route target of a second forwarding instance of the second DCI device includes the DCI interworking route target, the second DCI device generates a second packet based on the first packet, where the second packet includes routing information of the second forwarding instance and an export route target of the second forwarding instance. The second DCI device sends the second packet to a BGP EVPN neighbor that is of the second DCI device and that is in the second data center.

In an implementation, the first packet further includes a local interworking route target that is of the first data center and that is in the export route target of the first forwarding instance. After the second DCI device receives the first packet sent by the first DCI device, the second DCI device may further obtain a third forwarding instance in the second DCI device, where an import route target of the third forwarding instance includes the local interworking route target of the first data center. The second DCI device generates a third packet based on the first packet, where the third packet includes routing information of the third forwarding instance and an export route target of the third forwarding instance. The second DCI device sends the third packet to the BGP EVPN neighbor that is of the second DCI device and that is in the second data center.

In another implementation, the first packet further includes a local interworking route target that is of the first data center and that is in the export route target of the first forwarding instance. After the second DCI device receives the first packet sent by the first DCI device, the second DCI device further obtains a third forwarding instance in the second DCI device, where an import route target of the third forwarding instance includes the local interworking route target of the first data center. When the import route target of the third forwarding instance does not include the DCI interworking route target, the second DCI device determines that the third forwarding instance is unrelated to the first packet. That is, the second DCI device determines that, in the second DCI device, all forwarding instances in which import route targets do not include the DCI interworking route target are intra-DC interworking instances, and are not used to process a packet received across data centers.

In this application, a DCI interworking instance is pre-planned in the second DCI device, and a DCI identifier is added to the DCI interworking route target in configuration information of the second DCI device, so that the second DCI device processes, only for the DCI interworking instance, a packet that includes the DCI interworking route target and that is sent by the first DCI device, to implement routing information filtering at a receiving end. This avoids incorrect routing when an import route target of an intra-DC interworking instance of the second DCI device is the same as the local DCI interworking route target of the first data center, thereby ensuring network security.

Optionally, when the import route target of the second forwarding instance of the second DCI device includes the DCI interworking route target, the second DCI device further generates a forwarding entry of the second forwarding instance based on the routing information of the first forwarding instance.

According to a third aspect, a routing information transmission apparatus is provided. The apparatus includes a plurality of functional modules. The plurality of functional modules interact with each other to implement the method in the first aspect and the implementations of the first aspect. The plurality of functional modules may be implemented based on software, hardware, or a combination of software and hardware, and the plurality of functional modules may be randomly combined or divided based on example implementations.

According to a fourth aspect, a routing information transmission apparatus is provided. The apparatus includes a plurality of functional modules. The plurality of functional modules interact with each other to implement the method in the second aspect and the implementations of the second aspect. The plurality of functional modules may be implemented based on software, hardware, or a combination of software and hardware, and the plurality of functional modules may be randomly combined or divided based on example implementations.

According to a fifth aspect, a routing information transmission apparatus is provided. The routing information transmission apparatus includes a processor and a memory, where the memory is configured to store a computer program, and the computer program includes program instructions; and the processor is configured to invoke the computer program, to implement the routing information transmission method described in any implementation of the first aspect.

According to a sixth aspect, a routing information transmission apparatus is provided. The routing information transmission apparatus includes a processor and a memory, where the memory is configured to store a computer program, and the computer program includes program instructions; and the processor is configured to invoke the computer program, to implement the routing information transmission method described in any implementation of the second aspect.

According to a seventh aspect, a computer storage medium is provided. The computer storage medium stores instructions; and when the instructions are executed by a processor, the routing information transmission method described in any implementation of the first aspect or the second aspect is implemented.

According to an eighth aspect, a chip is provided. The chip includes a programmable logic circuit and/or program instructions. When the chip is run, the method in the first aspect and the implementations of the first aspect is implemented.

Beneficial effects brought by the technical solutions provided in this application may include at least the following.

A DCI interworking instance is pre-planned in a DCI device, and a DCI identifier is added to a DCI interworking route target in configuration information of the DCI device, so that the DCI device sends a packet including the DCI interworking route target only to a peer DCI device, to implement routing information filtering at a sending end. This may prevent a plurality of groups of repeated routing information and routing information that is not used for DCI interworking from being sent, thereby reducing waste of transmission resources and waste of memory resources and computing resources of the peer DCI device. The packet sent by the DCI device to the peer DCI device carries only the DCI interworking route target in an export route target of the DCI interworking instance, and/or a DCI interworking instance is pre-planned in the peer DCI device, and a DCI identifier is added to a DCI interworking route target in configuration information of the peer DCI device, so that the peer DCI device processes, only for the DCI interworking instance, a packet including the DCI interworking route target, to implement routing information filtering at a receiving end. This may avoid incorrect routing when an import route target of an intra-DC interworking instance of the peer DCI device is the same as a local DCI interworking route target of a data center in which the DCI device is located, thereby ensuring network security.

In addition, because the DCI identifier only needs to be set in the configuration information of the DCI device, a BGP EVPN protocol does not need to be changed, so that implementation is simple, and universality is relatively high.

DESCRIPTION OF EMBODIMENTS

To make the objectives, technical solutions, and advantages of this application clearer, the following further describes embodiments of this application in detail with reference to the accompanying drawings.

Figure 1:
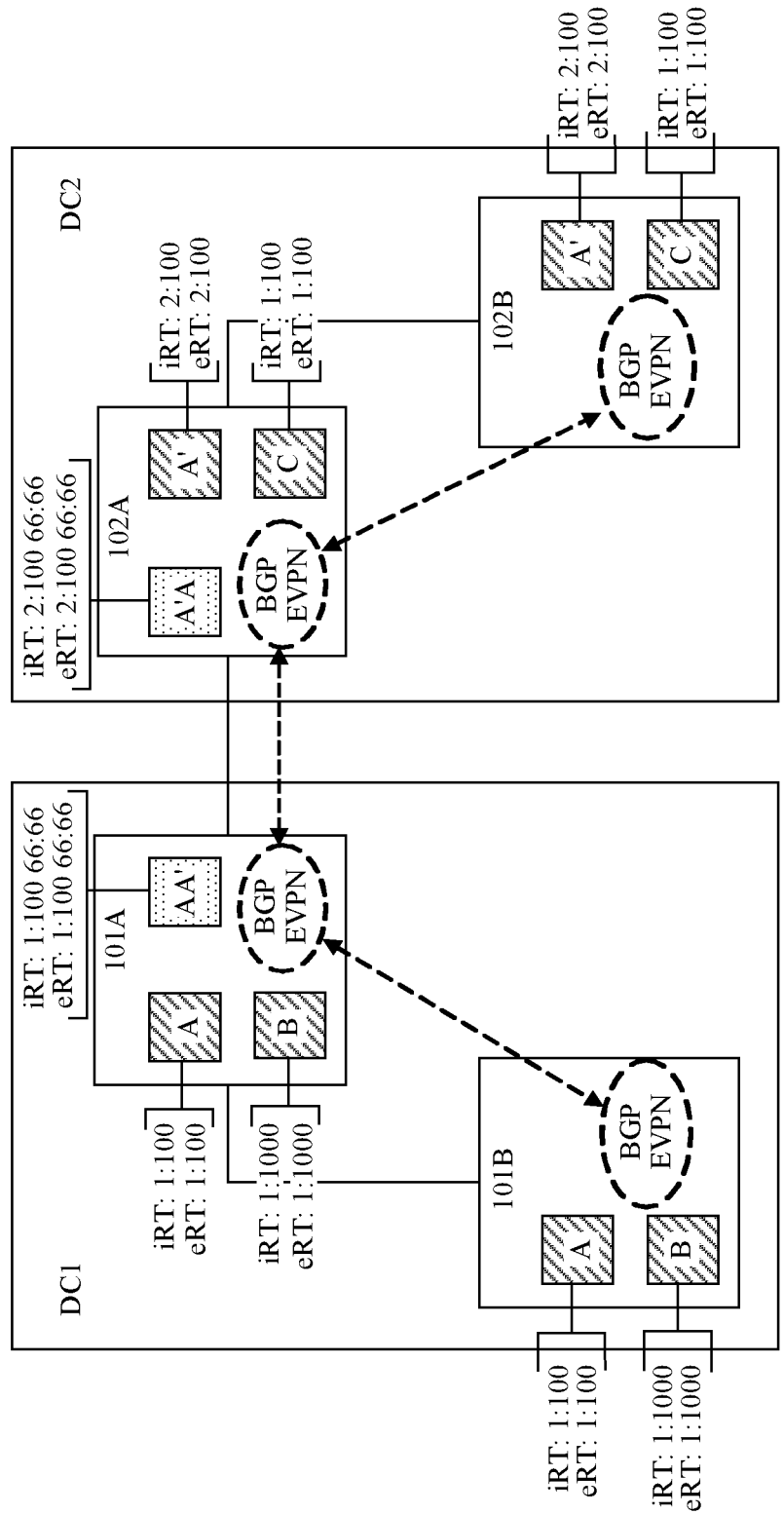
FIG. 1 is a schematic structural diagram of a DCI network according to an embodiment of this application.

FIG. 1 is a schematic structural diagram of a DCI network according to an embodiment of this application. As shown in FIG. 1, the DCI network includes a first data center DC1 and a second data center DC2 that are interconnected. The first data center DC1 includes a first DCI device 101A and a first access device 101B. The second data center DC2 includes a second DCI device 102A and a second access device 102B. A BGP EVPN peer-to-peer relationship is established between the first DCI device 101A and the second DCI device 102A. In other words, the first DCI device 101A and the second DCI device 102A are mutually BGP EVPN neighbors. In FIG. 1, a quantity of DCI devices and a quantity of access devices in each data center of the DCI network are merely used as an example for description, and are not intended to limit the DCI network provided in an embodiment of this application. The DCI device and the access device each may be a switch, a router, or the like.

Optionally, referring to FIG. 1, a BGP EVPN peer-to-peer relationship is established between the first DCI device 101A and the first access device 101B. In other words, the first DCI device 101A and the first access device 101B are mutually BGP EVPN neighbors. A BGP EVPN peer-to-peer relationship is established between the second DCI device 102A and the second access device 102B. In other words, the second DCI device 102A and the second access device 102B are mutually BGP EVPN neighbors.

Optionally, the first data center DC1 may further include a route reflector. The first DCI device 101A and the first access device 101B separately establish a BGP EVPN peer-to-peer relationship with the route reflector in the first data center DC1, and the first DCI device 101A and the first access device 101B are indirectly communicatively connected by using the route reflector. The second data center DC2 may also include a route reflector. The second DCI device 102A and the second access device 102B separately establish a BGP EVPN peer-to-peer relationship with the route reflector in the second data center DC2, and the second DCI device 102A and the second access device 102B are indirectly communicatively connected by using the route reflector.

In an embodiment of this application, the access device is a switch configured to connect to a server, and may be referred to as server-leaf. The DCI device serves as an edge device of the data center, is configured to connect to a switch of another data center, and may be referred to as DCI-leaf. The route reflector is configured to forward routing information transferred between the access device and the DCI device (the route reflector does not modify received routing information in a forwarding process).

Optionally, one or more forwarding instances are configured in the access device, and one forwarding instance corresponds to one forwarding table that is locally valid on the device. A plurality of forwarding instances is configured in the DCI device. Some of the forwarding instances in the DCI device may be used for data forwarding between different data centers (for example, used for DCI interworking), and some other forwarding instances may be used for data forwarding in the data center (for example, used for intra-DC interworking). Each forwarding instance in a same device independently operates to implement route isolation. In an embodiment of this application, forwarding instances in the access device and the DCI device may be layer-2 forwarding instances (L2VPN instances), or may be layer-3 forwarding instances (L3VPN instances). The L2VPN instance may also be referred to as a bridge domain (BD) instance (corresponding to a layer-2 forwarding domain). The L3VPN instance may also be referred to as a virtual routing forwarding (VRF) instance (corresponding to a layer-3 forwarding domain). A route target is configured for each forwarding instance, and may also be referred to as VPN-target. The route target is a BGP extended community attribute. Both an export route target and an import route target need to be configured for each forwarding instance. The local device and a peer device can mutually exchange BGP EVPN routes only when an export route target value configured for a forwarding instance of a local device is equal to an import route target value configured for a forwarding instance of the peer device. In an embodiment of this application, the import route target is iRT for short, and the export route target is eRT for short.

Optionally, one or more route targets are configured for one forwarding instance. For example, still referring to FIG. 1, the first DCI device 101A in the first data center DC1 includes a forwarding instance A, a forwarding instance B, and a forwarding instance AA'. The first access device 101B includes a forwarding instance A and a forwarding instance B. Both an iRT and an eRT of the forwarding instance A are 1:100, both an iRT and an eRT of the forwarding instance B are 1:1000, and both an iRT and an eRT of the forwarding instance AA' include 1:100 and 66:66. The second DCI device 102A in the second data center DC2 includes a forwarding instance A', a forwarding instance C, and a forwarding instance A'A. The second access device 102B includes a forwarding instance A' and a forwarding instance C. Both an iRT and an eRT of the forwarding instance A'A include 2:100 and 66:66, both an iRT and an eRT of the forwarding instance A' are 2:100, and both an iRT and an eRT of the forwarding instance C are 1:100. One route target is separately configured for the forwarding instance A, the forwarding instance B, the forwarding instance A', and the forwarding instance C, and two route targets are separately configured for the forwarding instance AA' and the forwarding instance A'A.

Because different data centers are usually planned independently, a same route target may be configured for forwarding instances in the different data centers. For example, the route target of the forwarding instance A in the first data center DC1 is the same as the route target of the forwarding instance C in the second data center DC2.

It is assumed that in the DCI network shown in FIG. 1, a virtual machine VM1a connected to the first access device 101B corresponds to the forwarding instance A, and a virtual machine VM1b corresponds to the forwarding instance B. A virtual machine VM2a connected to the second access device 102B corresponds to the forwarding instance A', and a virtual machine VM2b corresponds to the forwarding instance C. The virtual machine VM1a and the virtual machine VM2a are deployed in a same VLAN, and the virtual machine VM1a and the virtual machine VM2b are deployed in different VLANs. In this case, interworking between the forwarding instance A of the first access device 101B and the forwarding instance A' of the second access device 102B needs to be implemented, that is, routing information needs to be transferred between the forwarding instance A of the first access device 101B and the forwarding instance A' of the second access device 102B.

According to a current route transfer manner, a process of implementing interworking between the forwarding instance A of the first access device 101B and the forwarding instance A' of the second access device 102B includes:

After learning a host address of the virtual machine VM1a, the first access device 101B generates a routing entry and stores the routing entry in a routing table of the forwarding instance A, generates a BGP EVPN route corresponding to the forwarding instance A, and sends a packet including routing information of the forwarding instance A of the first access device 101B and the eRT (1:100) of the forwarding instance A to the first DCI device 101A. Because the eRT (1:100) of the forwarding instance A in the first access device 101B matches both the iRT (1:100) of the forwarding instance A and the iRT (1:100 66:66) of the forwarding instance AA' in the first DCI device 101A, the first DCI device 101A generates two packets based on the packet sent by the first access device 101B, where one packet includes routing information of the forwarding instance A of the first DCI device 101A and the eRT (1:100) of the forwarding instance A, and the other packet includes routing information of the forwarding instance AA' of the first DCI device 101A and the eRT (1:100 66:66) of the forwarding instance AA'. Then, the first DCI device 101A sends the two packets to the second DCI device 102A. However, the routing information of the forwarding instance A is the same as the routing information of the forwarding instance AA' in the first DCI device 101A, and both the routing information of the forwarding instance A and the routing information of the forwarding instance AA' include the host address of the virtual machine VM1a and a VTEP address of the first DCI device 101A. Therefore, that the first DCI device 101A sends the two packets to the second DCI device 102A causes repeated transfer of the routing information, and causes waste of transmission resources. In addition, the first DCI device 101A further directly forwards, to the second DCI device 102A, the received packet sent by the first access device 101B. This causes the first DCI device 101A to transmit a large amount of unwanted routing information to the second DCI device 102A, and also causes waste of transmission resources. After receiving the packets sent by the first DCI device 101A, the second DCI device 102A needs to separately process the packets. When receiving a plurality of packets carrying repeated routing information and/or a plurality of packets carrying unwanted routing information, the second DCI device 102A processes these packets, resulting in waste of memory resources and computing resources of the second DCI device 102A.

For example, the second DCI device 102A receives a packet including the routing information of the forwarding instance AA' of the first DCI device 101A and the eRT (1:100 66:66) of the forwarding instance AA' of the first DCI device 101A. Because the eRT (1:100 66:66) of the forwarding instance AA' of the first DCI device 101A matches both the iRT (2:100 66:66) of the forwarding instance A'A and the iRT (1:100) of the forwarding instance C in the second DCI device 102A, the second DCI device 102A generates two packets, where one packet includes routing information of the forwarding instance A'A of the second DCI device 102A and the eRT (2:100 66:66) of the forwarding instance A'A, and the other packet includes routing information of the forwarding instance C of the second DCI device 102A and the eRT (1:100) of the forwarding instance C. Then, the second DCI device 102A sends the two packets to the second access device 102B.

When receiving the packet including the routing information of the forwarding instance A'A of the second DCI device 102A and the eRT (2:100 66:66) of the forwarding instance A'A, the second access device 102B may match the forwarding instance A' whose iRT is (2:100) in the second access device 102B, to implement interworking between the forwarding instance A of the first access device 101B and the forwarding instance A' of the second access device 102B, thereby implementing communication between the virtual machine VM1a and the virtual machine VM2a. However, when receiving the packet including the routing information of the forwarding instance C of the second DCI device 102A and the eRT (1:100) of the forwarding instance C, the second access device 102B may match the forwarding instance C whose iRT is (1:100) in the second access device 102B, resulting in incorrect interworking between the forwarding instance A of the first access device 101B and the forwarding instance C of the second access device 102B, and further resulting in incorrect communication between the virtual machine VM1a and the virtual machine VM2b that do not belong to a same VLAN, thereby causing a network security risk.

In addition, according to the current route transfer manner, after the first access device 101B sends a packet including routing information of the forwarding instance B of the first access device 101B and the eRT (1:1000) of the forwarding instance B to the first DCI device 101A, the first DCI device 101A may match the forwarding instance B whose iRT is (1:1000) in the first DCI device 101A, generate a packet including the routing information of the forwarding instance B and the eRT (1:1000) of the forwarding instance B, and send the packet to the second DCI device 102A. However, because the forwarding instance B in the first access device 101B does not need to interwork with the devices in the second data center, this process causes waste of transmission resources. In addition, after receiving the packet, the second DCI device 102A further needs to process the packet, resulting in waste of memory resources and computing resources of the second DCI device 102A.

Figure 2A:
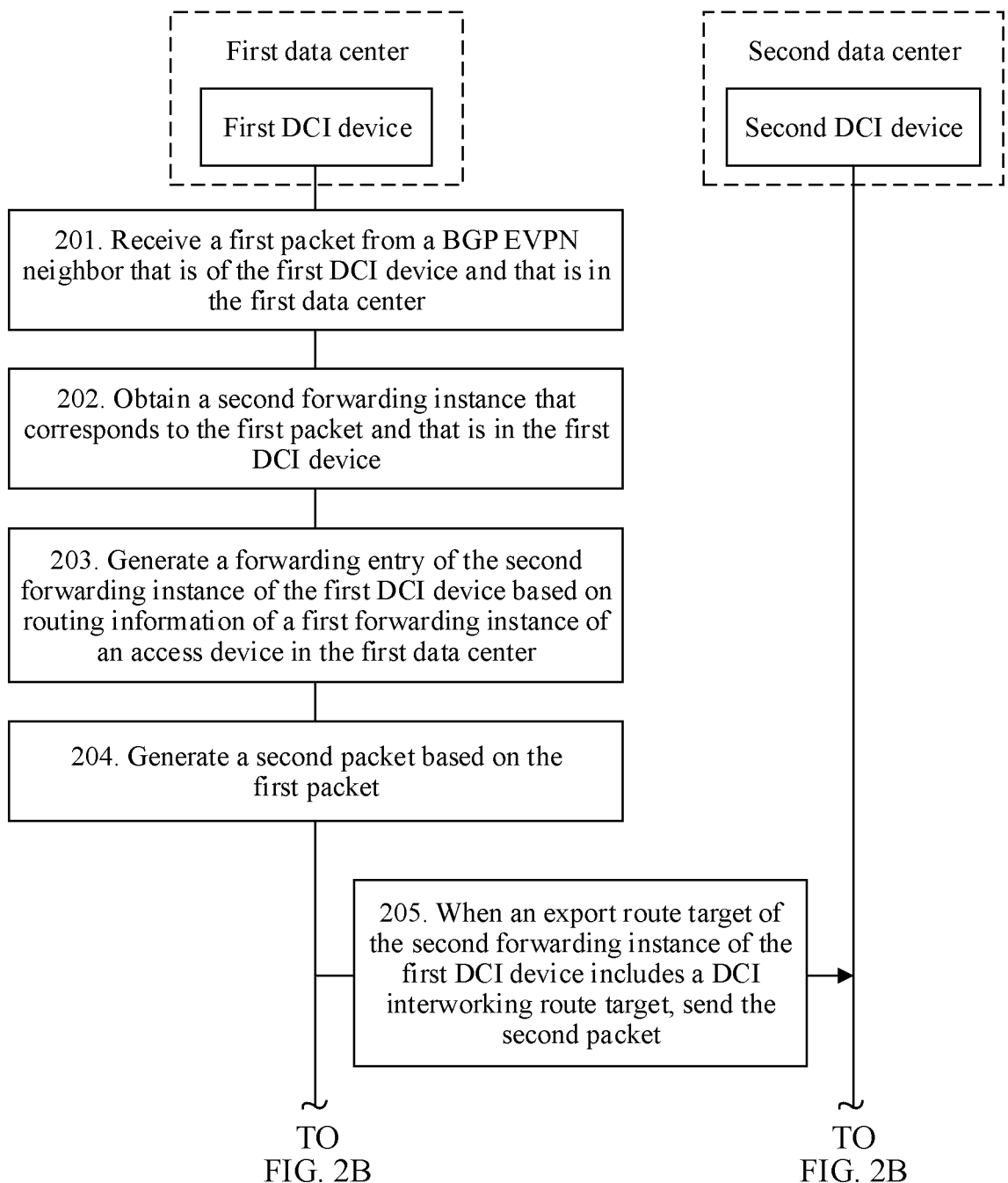
FIG. 2A and FIG. 2B are schematic flowcharts of a routing information transmission method according to an embodiment of this application.
Figure 2B:
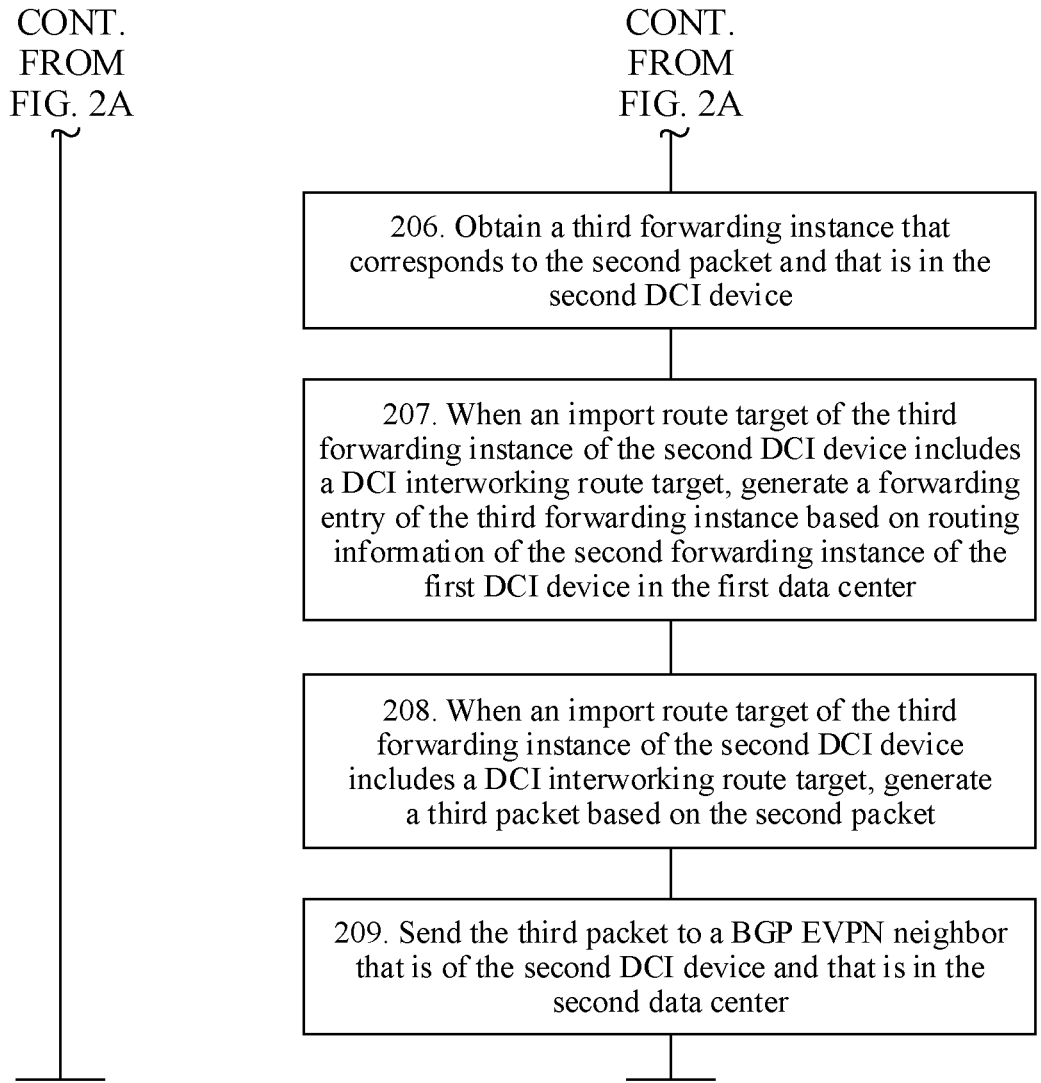

FIG. 2A and FIG. 2B are schematic flowcharts of a routing information transmission method according to an embodiment of this application. The method may be applied to the DCI network shown in FIG. 1. As shown in FIG. 2A and FIG. 2B, the method includes the following steps.

Step 201: A first DCI device in a first data center receives a first packet from a BGP EVPN neighbor that is of the first DCI device and that is in the first data center.

The first packet includes routing information of a first forwarding instance of an access device in the first data center and an export route target of the first forwarding instance. The first packet further includes an extended community attribute. In an embodiment of this application, a value of the extended community attribute of the packet is a type number of a VXLAN tunnel. For an example value of the extended community attribute, refer to related explanations of path attributes in a BGP update packet in request for comments (RFC) 4271. Details are not described herein.

In an embodiment of this application, routing information of a forwarding instance of the access device and routing information of a forwarding instance of the DCI device respectively include a BGP EVPN route corresponding to the forwarding instance and a next hop corresponding to the forwarding instance. The next hop is a VTEP address of the access device.

Optionally, after learning a host Internet Protocol (IP) address and/or a host media access control (MAC) address of a local VM, the access device in the first data center generates a routing entry and stores the routing entry in a routing table of the first forwarding instance, and generates a BGP EVPN route corresponding to the first forwarding instance.

A BGP EVPN route corresponding to a forwarding instance of an access device includes the host IP address and/or the host MAC address that are/is of a local VM and that are/is learned by the access device. The BGP EVPN route corresponding to the forwarding instance of the access device may be a Type 2 route (MAC route/IP route), a Type 3 route (inclusive multicast route), or a Type 5 route (IP prefix route) defined in BGP network layer reachability information (NLRI). The Type 2 route is used to announce a host MAC address, a host Address Resolution Protocol (ARP) mapping (namely, a correspondence between an IP address and a MAC address), or a host IP address, that is, the Type 2 route may be used to announce layer-2 routing information and/or layer-3 routing information. When the Type 2 route is used to announce the host ARP mapping, the Type 2 route may also be referred to as an ARP-type route. When the Type 2 route is used to announce the host IP address, the Type 2 route may also be referred to as an integrated routing and bridging (integrated routing and bridge, IRB) type route. The Type 3 route is used to transfer a layer-2 VXLAN network identifier (VNI) and a VTEP address. The Type 5 route is used to announce a host IP address or a network segment address, that is, the Type 5 route may be used to announce layer-3 routing information. Certainly, the BGP EVPN route may be alternatively a Type 6 route, a Type 7 route, or a Type 8 route, or may be another type of route that is subsequently obtained by evolution. A type of the BGP EVPN route is not limited in an embodiment of this application.

Optionally, a packet used to transfer routing information in an embodiment of this application includes the content in Table 1.

TABLE 1

BGP EVPN route
Next hop
Extended community attribute
eRT

For example, the access device of the first data center is the first access device 101B in the DCI network shown in FIG. 1, and the first forwarding instance is the forwarding instance A in the first access device 101B. It is assumed that a VTEP address of the first access device 101B is 1.1.1.1, and a host IP address of the virtual machine VM1*a* corresponding to the forwarding instance A is 192.102.11.1. For content included in the first packet, refer to Table 2.

TABLE 2

| BGP EVPN route | 192.102.11.1 |
|---|---|
| Next hop | 1.1.1.1 |
| Extended community attribute | Type number of VXLAN tunnel |
| eRT | 1:100 |

Optionally, the BGP EVPN neighbor of the first DCI device may be the access device in the first data center, or may be a route reflector in the first data center. When the BGP EVPN neighbor of the first DCI device is a route reflector, the route reflector forwards, to the first DCI device, the first packet sent by the access device to the route reflector.

Step 202: The first DCI device obtains a second forwarding instance that corresponds to the first packet and that is in the first DCI device.

An import route target of the second forwarding instance in the first DCI device matches an export route target of the first forwarding instance of the foregoing access device. That an import route target of one forwarding instance matches an export route target of another forwarding instance means that there is an intersection set between one or more import route targets configured for the forwarding instance and one or more export route targets configured for another forwarding instance.

For example, the first DCI device is the first DCI device 101A in the DCI network shown in FIG. 1. With reference to the example in step 201, the iRT (1:100) of the forwarding instance A and the iRT (1:100 66:66) of the forwarding instance AA' in the first DCI device 101A match the eRT (1:100) of the forwarding instance A of the first access device 101B. In step 202, the second forwarding instance that corresponds to the first packet and that is obtained by the first DCI device 101A includes the forwarding instance A and the forwarding instance AA'.

Step 203: The first DCI device generates a forwarding entry of the second forwarding instance of the first DCI device based on the routing information of the first forwarding instance of the access device in the first data center.

Optionally, after receiving the first packet, the first DCI device sends the first packet to each forwarding instance of the first DCI device. Each forwarding instance separately determines whether the forwarding instance corresponds to the first packet, that is, determines whether an import route target of the forwarding instance matches the export route target carried in the first packet. If the forwarding instance corresponds to the first packet, the first DCI device generates a forwarding entry of the forwarding instance. If the forwarding instance does not correspond to the first packet, the forwarding instance directly discards the first packet.

For example, with reference to the example in step 202, both a forwarding entry of the forwarding instance A and a forwarding entry of the forwarding instance AA' that are in the first DCI device 101A and that are generated by the first DCI device 101A based on the routing information of the forwarding instance A of the first access device 101B may be shown in Table 3.

TABLE 3

| Destination IP address | Next hop | Outbound interface |
|---|---|---|
| 192.102.11.1 | 1.1.1.1 | VXLAN tunnel |

Step 204: The first DCI device generates a second packet based on the first packet.

The second packet includes routing information of the second forwarding instance of the first DCI device and an export route target of the second forwarding instance. That the first DCI device generates a second packet based on the first packet includes that the first DCI device modifies a next hop in the first packet as a VTEP address of the first DCI device, and replaces the eRT of the first forwarding instance with the export route target of the second forwarding instance for re-encapsulation, to obtain the second packet.

For example, with reference to the example in step 203, the first DCI device 101A generates a packet including the routing information of the forwarding instance A of the first DCI device 101A and the eRT of the forwarding instance A based on the first packet. In addition, the first DCI device 101A generates a packet including the routing information of the forwarding instance AA' of the first DCI device 101A and the eRT of the forwarding instance AA' based on the first packet. It is assumed that the VTEP address of the first DCI device 101A is 2.2.2.2. For content included in the packet that corresponds to the forwarding instance A and that is generated by the first DCI device 101A, refer to Table 4, and for content included in the packet that corresponds to the forwarding instance AA' and that is generated by the first DCI device 101A, refer to Table 5.

TABLE 4

| BGP EVPN route | 192.102.11.1 |
|---|---|
| Next hop | 2.2.2.2 |
| Extended community attribute | Type number of VXLAN tunnel |
| eRT | 1:100 |

TABLE 5

| BGP EVPN route | 192.102.11.1 |
|---|---|
| Next hop | 2.2.2.2 |
| Extended community attribute | Type number of VXLAN tunnel |
| eRT | 1:100 66:66 |

Step 205: When the export route target of the second forwarding instance of the first DCI device includes a DCI interworking route target, the first DCI device sends the second packet to the second DCI device in the second data center.

The second DCI device in the second data center is a BGP EVPN neighbor of the first DCI device in the first data center. In the DCI network provided in an embodiment of this application, a local interworking route target and a DCI interworking route target are configured for a data center, and in the data center, the local interworking route target is different from the DCI interworking route target. The local interworking route target of the data center may be independently planned by the data center, and the DCI interworking route target is usually jointly planned by two interconnected data centers.

Optionally, the local interworking route target of the data center may be configured for a forwarding instance used to perform intra-DC interworking (intra-DC interworking instance hereinafter). The DCI interworking route target may be configured for a forwarding instance used to perform DCI interworking (DCI interworking instance hereinafter), and the local interworking route target of the data center may be further configured for the DCI interworking instance.

In an embodiment of this application, a DCI interworking instance may be pre-planned in a DCI device, and a DCI identifier may be added to a DCI interworking route target in configuration information of the DCI device. A route target for which a DCI identifier is configured indicates that the route target is a DCI interworking route target, and a route target for which a DCI identifier is not configured indicates that the route target is not a DCI interworking route target.

For example, in the DCI network shown in FIG. 1, the forwarding instance AA' of the first DCI device 101A is a DCI interworking instance, and the forwarding instance AA' is an L3 VPN instance. Therefore, in configuration information of the first DCI device 101A, the forwarding instance AA' is configured as follows:
　　ip vpn-instance vpnAA'
　　ipv4-family
　　　　route-distinguisher 100:1
　　　　vpn-target 1:100 export-extcommunity
　　　　vpn-target 66:66 export-extcommunity dci
　　　　vpn-target 1:100 import-extcommunity
　　　　vpn-target 66:66 import-extcommunity dci "dci" represents a DCI identifier, a set indicates that the route target is a DCI interworking route target, and a non-set indicates that the route target is not a DCI interworking route target. The foregoing configuration indicates that the import route target 66:66 and the export route target 66:66 of the forwarding instance AA' are DCI interworking route targets, and the import route target 1:100 and the export route target 1:100 of the forwarding instance AA' are not DCI interworking route targets.

For example, with reference to the example in step 204, because the export route target 1:100 66:66 of the forwarding instance AA' of the first DCI device 101A includes the DCI interworking route target 66:66, the first DCI device sends the packet including the content in Table 5 to the second DCI device 102A. In addition, because the export route target 1:100 of the forwarding instance A of the first DCI device 101A does not include the DCI interworking route target 66:66, the first DCI device 101A does not send the packet including the content in Table 4 to the second DCI device 102A, and the first DCI device 101A may store the packet in the first DCI device 101A, forward the packet to another device in the first data center, or discard the packet.

In an embodiment of this application, the DCI interworking instance is pre-planned in the first DCI device, and the DCI identifier is added to the DCI interworking route target in configuration information of the first DCI device, so that the first DCI device sends a packet including the DCI interworking route target only to the second DCI device, to implement routing information filtering at a sending end. This not only prevents a plurality of groups of repeated routing information from being sent, but also prevents routing information transferred in the data center from being sent to another data center, thereby reducing waste of transmission resources and waste of memory resources and computing resources of the second DCI device. In addition, because the DCI identifier only needs to be set in the configuration information of the DCI device and does not need to be transferred to a peer device by using a BGP EVPN protocol, the BGP EVPN protocol does not need to be changed, so that implementation is simple, and universality is relatively high.

Optionally, the export route target of the second forwarding instance of the first DCI device further includes a local interworking route target, and the local interworking route target is a local interworking route target of the first data center. An implementation process in which the first DCI device sends the second packet to the second DCI device may include, after deleting the local interworking route target from the second packet, the first DCI device sends the second packet to the second DCI device.

For example, content included in the second packet generated by the first DCI device is shown in Table 5. 1:100 is the local interworking route target of the first data center, and 66:66 is the DCI interworking route target. Therefore, the local interworking route target 1:100 in the packet may be deleted, only the DCI interworking route target 66:66 is reserved, and then the second packet including the content in Table 6 is sent to the second DCI device.

TABLE 6

| BGP EVPN route | 192.102.11.1 |
|---|---|
| Next hop | 2.2.2.2 |
| Extended community attribute | Type number of VXLAN tunnel |
| eRT | 66:66 |

In an embodiment of this application, the packet sent by the first DCI device to the second DCI device carries only the DCI interworking route target in an export route target of the DCI interworking instance. This may avoid incorrect routing when an import route target of an intra-DC interworking instance of the second DCI device is the same as the local DCI interworking route target of the first data center. For example, in the DCI network shown in FIG. 1, the first DCI device sends the second packet including the content in Table 6 to the second DCI device. This may avoid incorrect interworking between the forwarding instance C of the second DCI device 102A and the forwarding instance AA' of the first DCI device 101A, thereby ensuring network security.

Optionally, before the first DCI device sends the second packet to the second DCI device, the first DCI device needs to determine whether the second DCI device is a DCI BGP EVPN neighbor of the first DCI device, that is, whether the second DCI device and the first DCI device are in different data centers. In an embodiment of this application, a DCI attribute of the BGP EVPN neighbor may be set, the first DCI device determines, based on the DCI attribute, whether the BGP EVPN neighbor of the first DCI device is a DCI BGP EVPN neighbor. Alternatively, whether the BGP EVPN neighbor is a DCI BGP EVPN neighbor may be implicitly specified in another manner, for example, a horizontal split group attribute is set. Alternatively, determining may be further comprehensively performed by using a typical scenario, for example, an internal BGP (iBGP) EVPN is used between intra-DC BGP EVPN peers, and an external BGP (eBGP) EVPN is used between DCI BGP EVPN peers. When the DCI BGP EVPN peers need to transfer an iBGP route to each other, a next hop is modified as an address of a local device.

Step 206: The second DCI device obtains a third forwarding instance that corresponds to the second packet and that is in the second DCI device.

For an explanation of this step, refer to step 202. Details are not described herein again in an embodiment of this application.

For example, the DCI network shown in FIG. 1 is still used as an example. When the second packet includes the content in Table 6, in step 206, the third forwarding instance that corresponds to the second packet and that is obtained by the second DCI device includes the forwarding instance A'A. When the second packet includes the content in Table 5, in step 206, the third forwarding instance that corresponds to the second packet and that is obtained by the second DCI device includes the forwarding instance A'A and the forwarding instance C.

Step 207: When an import route target of the third forwarding instance of the second DCI device includes the DCI interworking route target, the second DCI device generates a forwarding entry of the third forwarding instance based on the routing information of the second forwarding instance of the first DCI device in the first data center.

For an explanation of this step, refer to step 203. Details are not described herein again in an embodiment of this application.

For example, with reference to the example in step 206, the import route target of the forwarding instance A'A of the second DCI device 102A includes the DCI interworking route target 66:66. Therefore, the second DCI device 102A generates a forwarding entry of the forwarding instance A'A in the second DCI device 102A based on the routing information of the forwarding instance AA' of the first DCI device 101A. The forwarding entry may be shown in Table 7.

TABLE 7

| Destination IP address | Next hop | Outbound interface |
|---|---|---|
| 192.102.11.1 | 2.2.2.2 | VXLAN tunnel |

Step 208: When the import route target of the third forwarding instance of the second DCI device includes the DCI interworking route target, the second DCI device generates a third packet based on the second packet.

The third packet includes routing information of the third forwarding instance and an export route target of the third forwarding instance. For a process in which the second DCI device generates the third packet based on the second packet, refer to the process in which the first DCI device generates the second packet based on the first packet in step 204. Details are not described herein again in an embodiment of this application.

For example, with reference to the example in step 207, the second DCI device 102A generates a packet including the routing information of the forwarding instance A'A of the second DCI device 102A and the eRT of the forwarding instance A'A based on the second packet. It is assumed that a VTEP address of the second DCI device 102A is 3.3.3.3. For content included in the packet corresponding to the forwarding instance A'A, refer to Table 8.

TABLE 8

| BGP EVPN route | 192.102.11.1 |
|---|---|
| Next hop | 3.3.3.3 |
| Extended community attribute | Type number of VXLAN tunnel |
| eRT | 2:100 66:66 |

Optionally, when the second packet further includes the local interworking route target that is of the first data center and that is in the export route target of the second forwarding instance of the first DCI device, in an embodiment of this application, a step performed by the second DCI device is described separately for two cases in configuration information of the second DCI device, for example, the DCI identifier is not added to the DCI interworking route target and the DCI identifier is added to the DCI interworking route target.

In a first optional embodiment of this application, when the DCI identifier is not added to the DCI interworking route target in the configuration information of the second DCI device, after the second DCI device receives the second packet sent by the first DCI device, the second DCI device further obtains a fourth forwarding instance in the second DCI device, where an import route target of the fourth forwarding instance includes the local interworking route target of the first data center. The second DCI device generates a fourth packet based on the second packet, where the fourth packet includes routing information of the fourth forwarding instance and an export route target of the fourth forwarding instance. The second DCI device sends the fourth packet to the BGP EVPN neighbor that is of the second DCI device and that is in the second data center.

For example, with reference to the example in step 207, the second DCI device 102A generates a packet including the routing information of the forwarding instance C of the second DCI device 102A and the eRT of the forwarding instance C based on the second packet. It is assumed that the VTEP address of the second DCI device 102A is 3.3.3.3. For content included in the packet corresponding to the forwarding instance C, refer to Table 9.

TABLE 9

| BGP EVPN route | 192.102.11.1 |
|---|---|
| Next hop | 3.3.3.3 |
| Extended community attribute | Type number of VXLAN tunnel |
| eRT | 1:100 |

Optionally, the second DCI device further generates a forwarding entry of the fourth forwarding instance based on the routing information carried in the second packet. For example, with reference to the example in step 206, when the second packet includes the content in Table 5, the second DCI device 102A further generates a forwarding entry of the forwarding instance C in the second DCI device 102A based on the routing information of the forwarding instance AA' of the first DCI device 101A. The forwarding entry may be shown in Table 7.

In a second optional embodiment of this application, when the DCI identifier is added to the DCI interworking route target in the configuration information of the second DCI device, after the second DCI device receives the second packet sent by the first DCI device, the second DCI device obtains a fourth forwarding instance in the second DCI device, where an import route target of the fourth forwarding instance includes the local interworking route target of the first data center. When the import route target of the fourth forwarding instance does not include the DCI interworking route target, the second DCI device determines that the fourth forwarding instance is unrelated to the first packet. That is, the second DCI device determines that, in the second DCI device, all forwarding instances in which import route targets do not include the DCI interworking route target are intra-DC interworking instances, and are not used to process a packet received across data centers.

For example, in the DCI network shown in FIG. 1, if the forwarding instance A'A of the second DCI device 102A is a DCI interworking instance, and the forwarding instance A'A is an L3 VPN instance, in configuration information of the second DCI device 102A, the forwarding instance A'A is configured as follows:

ip vpn-instance vpnA'A
    ipv4-family
        route-distinguisher 200:1
        vpn-target 2:100 export-extcommunity
        vpn-target 66:66 export-extcommunity dci
        vpn-target 2:100 import-extcommunity
        vpn-target 66:66 import-extcommunity dci "dci" represents a DCI identifier, a set indicates that the route target is a DCI interworking route target, and a non-set indicates that the route target is not a DCI interworking route target. The foregoing configuration indicates that the import route target 66:66 and the export route target 66:66 of the forwarding instance A'A are DCI interworking route targets, and the import route target 2:100 and the export route target 2:100 of the forwarding instance A'A are not DCI interworking route targets.

In an embodiment of this application, the DCI interworking instance is pre-planned in the second DCI device, and the DCI identifier is added to the DCI interworking route target in the configuration information of the second DCI device, so that the second DCI device processes, only for the DCI interworking instance, a packet that includes the DCI interworking route target and that is sent by the first DCI device, to implement routing information filtering at a receiving end. This avoids incorrect routing when an import route target of an intra-DC interworking instance of the second DCI device is the same as the local DCI interworking route target of the first data center, thereby ensuring network security. In addition, because the DCI identifier only needs to be set in the configuration information of the DCI device, a BGP EVPN protocol does not need to be changed, so that implementation is simple, and universality is relatively high.

A sequence of step 207 and step 208 is not limited.

Step 209: The second DCI device sends the third packet to the BGP EVPN neighbor that is of the second DCI device and that is in the second data center.

Optionally, the export route target of the third forwarding instance of the second DCI device includes the DCI interworking route target and a local interworking route target of the second data center. An implementation process in which the second DCI device sends the third packet to the BGP EVPN neighbor of the second DCI device may include, after deleting the DCI interworking route target from the third packet, the second DCI device sends the third packet to the BGP EVPN neighbor of the second DCI device.

For example, in the DCI network shown in FIG. 1, the BGP EVPN neighbor that is of the second DCI device 102A and that is in the second data center may be the second access device 102B. After receiving the third packet, the second access device 102B may generate a forwarding entry of the forwarding instance A' based on the routing information that is of the forwarding instance A'A of the second DCI device 102A and that is carried in the third packet. The forwarding entry may be shown in Table 10. So far, interworking is implemented between the forwarding instance A of the first access device 101B and the forwarding instance A' of the second access device 102B.

TABLE 10

| Destination IP address | Next hop | Outbound interface |
|---|---|---|
| 192.102.11.1 | 3.3.3.3 | VXLAN tunnel |

A sequence of steps of the routing information transmission method provided in an embodiment of this application may be adjusted appropriately. For example, step 203 may be performed before step 202, or step 203 and step 202 may be performed simultaneously. A quantity of the steps may also be increased or decreased based on a situation. Any variation readily figured out by a person skilled in the art within the technical scope disclosed in this application shall fall within the protection scope of this application, and therefore, details are not described herein.

According to the routing information transmission method provided in an embodiment of this application, a DCI interworking instance is pre-planned in a DCI device, and a DCI identifier is added to a DCI interworking route target in configuration information of the DCI device, so that the DCI device sends a packet including the DCI interworking route target only to a peer DCI device, to implement routing information filtering at a sending end. This may prevent a plurality of groups of repeated routing information and routing information that is not used for DCI interworking from being sent, thereby reducing waste of transmission resources and waste of memory resources and computing resources of the peer DCI device. The packet sent by the DCI device to the peer DCI device carries only the DCI interworking route target in an export route target of the DCI interworking instance, and/or a DCI interworking instance is pre-planned in the peer DCI device, and a DCI identifier is added to a DCI interworking route target in configuration information of the peer DCI device, so that the peer DCI device processes, only for the DCI interworking instance, a packet including the DCI interworking route target, to implement routing information filtering at a receiving end. This may avoid incorrect routing when an import route target of an intra-DC interworking instance of the peer DCI device is the same as a local DCI interworking route target of a data center in which the DCI device is located, thereby ensuring network security.

In addition, because the DCI identifier only needs to be set in the configuration information of the DCI device, a BGP EVPN protocol does not need to be changed, so that implementation is simple, and universality is relatively high.

Figure 3:
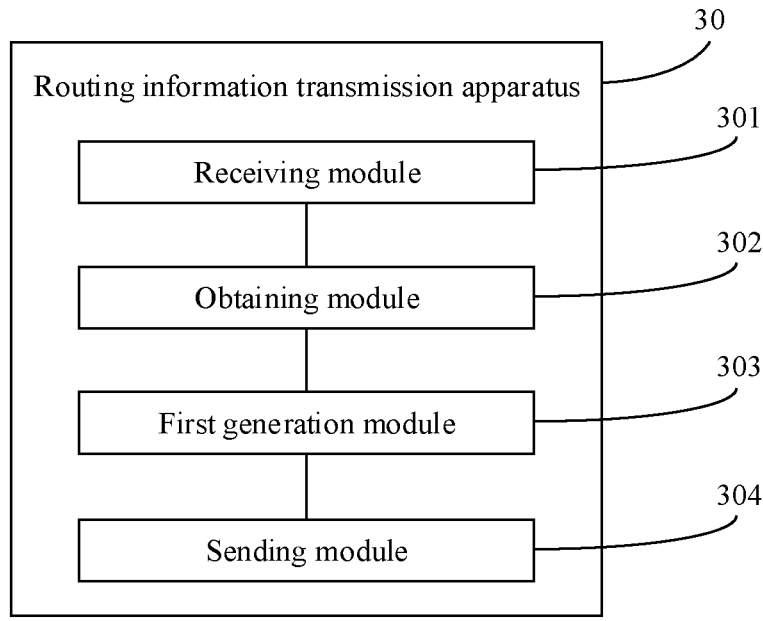
FIG. 3 is a schematic structural diagram of a routing information transmission apparatus according to an embodiment of this application.

FIG. 3 is a schematic structural diagram of a routing information transmission apparatus according to an embodiment of this application. The routing information transmission apparatus is configured to implement functions of the first DCI device in the foregoing implementations. As shown in FIG. 3, an apparatus 30 includes a receiving module 301 configured to receive a first packet from a BGP EVPN neighbor that is of a first DCI device and that is in a first data center, where the first packet includes routing information of a first forwarding instance of an access device in the first data center and an export route target of the first forwarding instance; an obtaining module 302 configured to obtain a second forwarding instance that corresponds to the first packet and that is in the first DCI device, where an import route target of the second forwarding instance matches the export route target of the first forwarding instance; a first generation module 303 configured to generate a second packet based on the first packet, where the second packet includes routing information of the second forwarding instance and an export route target of the second forwarding instance; and a sending module 304 configured to, when the export route target of the second forwarding instance includes a DCI interworking route target, send the second packet to a second DCI device in a second data center, where the second DCI device is a BGP EVPN neighbor of the first DCI device.

In the routing information transmission apparatus provided in an embodiment of this application, a DCI interworking instance is pre-planned in a DCI device, and a DCI identifier is added to a DCI interworking route target in configuration information of the DCI device, so that the DCI device sends a packet including the DCI interworking route target only to a peer DCI device by using the sending module, to implement routing information filtering at a sending end. This may prevent a plurality of groups of repeated routing information and routing information that is not used for DCI interworking from being sent, thereby reducing waste of transmission resources and waste of memory resources and computing resources of the peer DCI device. In addition, because the DCI identifier only needs to be set in the configuration information of the DCI device and does not need to be transferred to a peer device by using a BGP EVPN protocol, the BGP EVPN protocol does not need to be changed, so that implementation is simple, and universality is relatively high.

Optionally, the export route target of the second forwarding instance further includes a local interworking route target. The sending module 304 is configured to, after the local interworking route target is deleted from the second packet, send the second packet to the second DCI device.

Figure 4:
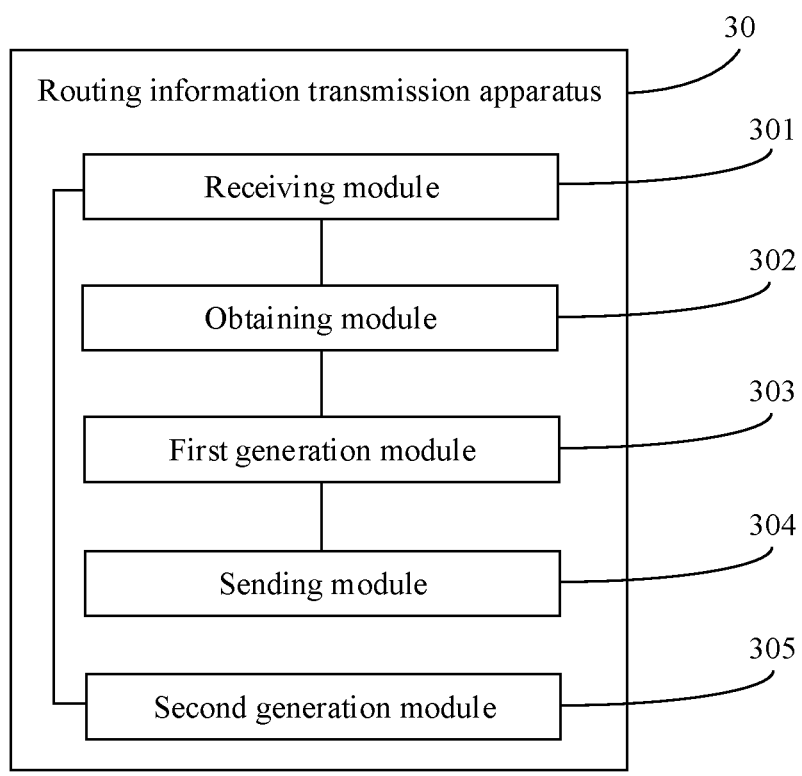
FIG. 4 is a schematic structural diagram of another routing information transmission apparatus according to an embodiment of this application.

Optionally, as shown in FIG. 4, the apparatus 30 further includes a second generation module 305 configured to generate a forwarding entry of the second forwarding instance based on the routing information of the first forwarding instance.

In the routing information transmission apparatus provided in an embodiment of this application, a DCI interworking instance is pre-planned in a DCI device, and a DCI identifier is added to a DCI interworking route target in configuration information of the DCI device, so that the DCI device sends a packet including the DCI interworking route target only to a peer DCI device by using the sending module, to implement routing information filtering at a sending end. This may prevent a plurality of groups of repeated routing information and routing information that is not used for DCI interworking from being sent, thereby reducing waste of transmission resources and waste of memory resources and computing resources of the peer DCI device. The packet sent by the DCI device to the peer DCI device carries only the DCI interworking route target in an export route target of the DCI interworking instance. This may avoid incorrect routing when an import route target of an intra-DC interworking instance of the peer DCI device is the same as a local DCI interworking route target of a data center in which the DCI device is located, thereby ensuring network security. In addition, because the DCI identifier only needs to be set in the configuration information of the DCI device and does not need to be transferred to a peer device by using a BGP EVPN protocol, the BGP EVPN protocol does not need to be changed, so that implementation is simple, and universality is relatively high.

Figure 5:
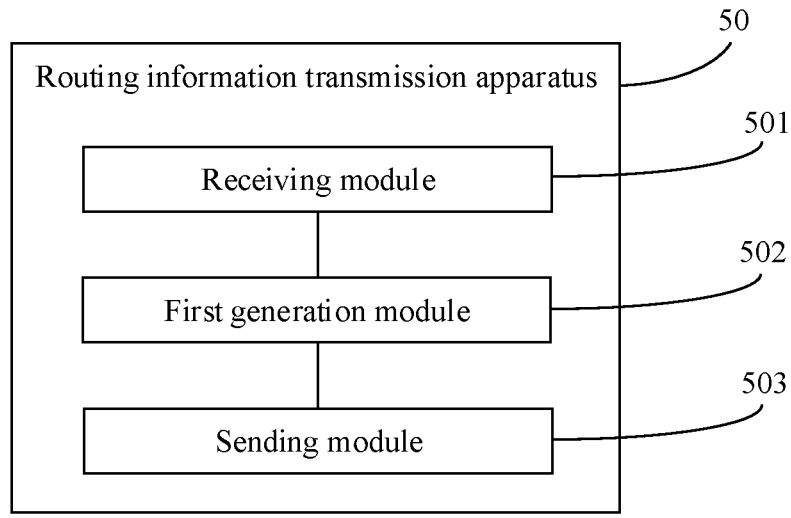
FIG. 5 is a schematic structural diagram of a routing information transmission apparatus according to another embodiment of this application.

FIG. 5 is a schematic structural diagram of a routing information transmission apparatus according to another embodiment of this application. The routing information transmission apparatus is configured to implement functions of the second DCI device in the foregoing implementations. As shown in FIG. 5, an apparatus 50 includes a receiving module 501 configured to receive a first packet sent by a first DCI device in a first data center, where the first packet includes routing information of a first forwarding instance of the first DCI device and a DCI interworking route target in an export route target of the first forwarding instance, and a second DCI device is a BGP EVPN neighbor of the first DCI device; a first generation module 502 configured to, when an import route target of a second forwarding instance of the second DCI device includes the DCI interworking route target, generate a second packet based on the first packet, where the second packet includes routing information of the second forwarding instance and an export route target of the second forwarding instance; and a sending module 503 configured to send the second packet to a BGP EVPN neighbor that is of the second DCI device and that is in a second data center.

In the routing information transmission apparatus provided in an embodiment of this application, a DCI interworking instance is pre-planned in a DCI device, and a DCI identifier is added to a DCI interworking route target in configuration information of the DCI device, so that the DCI device sends a packet including the DCI interworking route target only to a peer DCI device, to implement routing information filtering at a sending end. This may prevent a plurality of groups of repeated routing information and routing information that is not used for DCI interworking from being sent, thereby reducing waste of transmission resources and waste of memory resources and computing resources of the peer DCI device. In addition, because the DCI identifier only needs to be set in the configuration information of the DCI device, a BGP EVPN protocol does not need to be changed, so that implementation is simple, and universality is relatively high.

Optionally, the first packet further includes a local interworking route target that is of the first data center and that is in the export route target of the first forwarding instance.

Figure 6:
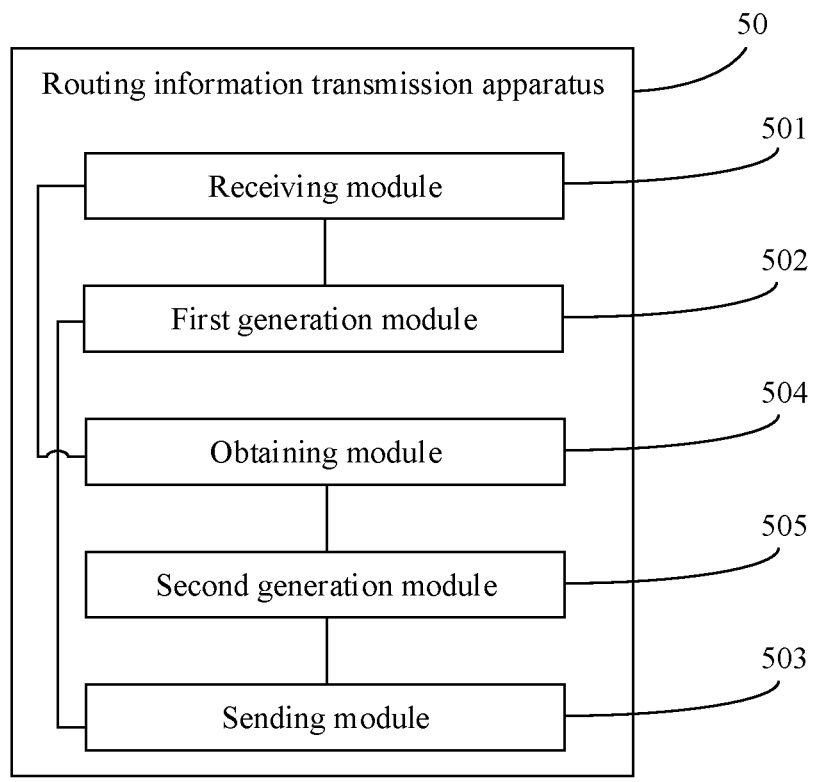
FIG. 6 is a schematic structural diagram of another routing information transmission apparatus according to another embodiment of this application.

In an implementation, as shown in FIG. 6, the apparatus 50 further includes an obtaining module 504 configured to, after the second DCI device receives the first packet sent by the first DCI device, obtain a third forwarding instance in the second DCI device, where an import route target of the third forwarding instance includes the local interworking route target of the first data center; and a second generation module 505 configured to generate a third packet based on the first packet, where the third packet includes routing information of a third forwarding instance and an export route target of the third forwarding instance.

The sending module 503 is further configured to send the third packet to the BGP EVPN neighbor that is of the second DCI device and that is in the second data center.

Figure 7:
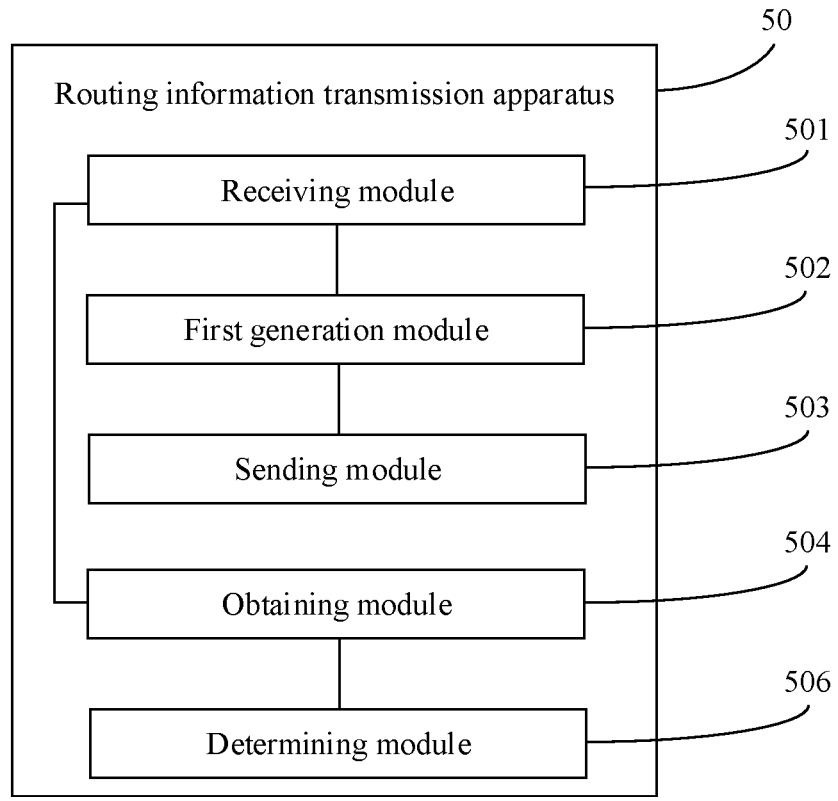
FIG. 7 is a schematic structural diagram of still another routing information transmission apparatus according to another embodiment of this application.

In another implementation, as shown in FIG. 7, the apparatus 50 further includes an obtaining module 504 configured to, after the second DCI device receives the first packet sent by the first DCI device, obtain a third forwarding instance in the second DCI device, where an import route target of the third forwarding instance includes the local interworking route target of the first data center; and a determining module 506 configured to, when the import route target of the third forwarding instance does not include the DCI interworking route target, determine, by the second DCI device, that the third forwarding instance is unrelated to the first packet.

Figure 8:
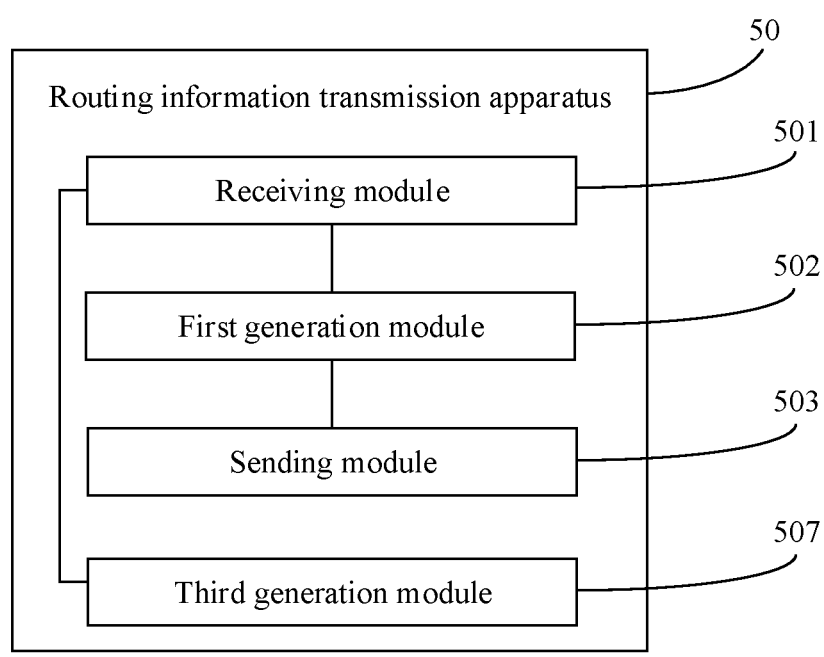
FIG. 8 is a schematic structural diagram of yet another routing information transmission apparatus according to another embodiment of this application.

Optionally, as shown in FIG. 8, the apparatus 50 further includes a third generation module 507 configured to, when the import route target of the second forwarding instance of the second DCI device includes the DCI interworking route target, generate a forwarding entry of the second forwarding instance based on the routing information of the first forwarding instance.

In the routing information transmission apparatus provided in an embodiment of this application, a DCI interworking instance is pre-planned in a DCI device, and a DCI identifier is added to a DCI interworking route target in configuration information of the DCI device, so that the DCI device sends a packet including the DCI interworking route target only to a peer DCI device, to implement routing information filtering at a sending end. This may prevent a plurality of groups of repeated routing information and routing information that is not used for DCI interworking from being sent, thereby reducing waste of transmission resources and waste of memory resources and computing resources of the peer DCI device. A DCI interworking instance is pre-planned in the peer DCI device, and a DCI identifier is added to a DCI interworking route target in configuration information of the peer DCI device, so that the peer DCI device processes, only for the DCI interworking instance, a packet including the DCI interworking route target, to implement routing information filtering at a receiving end. This may avoid incorrect routing when an import route target of an intra-DC interworking instance of the peer DCI device is the same as a local DCI interworking route target of a data center in which the DCI device is located, thereby ensuring network security. In addition, because the DCI identifier only needs to be set in the configuration information of the DCI device, a BGP EVPN protocol does not need to be changed, so that implementation is simple, and universality is relatively high.

For the apparatus in the foregoing embodiment, a manner of performing an operation by each module is described in detail in the embodiments related to the method, and details are not described herein again.

An embodiment of this application provides a DCI network. The DCI network includes a first data center and a second data center that are interconnected. The first data center includes a first DCI device, and the second data center includes a second DCI device. The first DCI device and the second DCI device are mutually BGP EVPN neighbors.

The first DCI device includes the routing information transmission apparatus shown in FIG. 3 or FIG. 4, and the second DCI device includes the routing information transmission apparatus shown in any one of FIG. 5 to FIG. 8.

Figure 9:
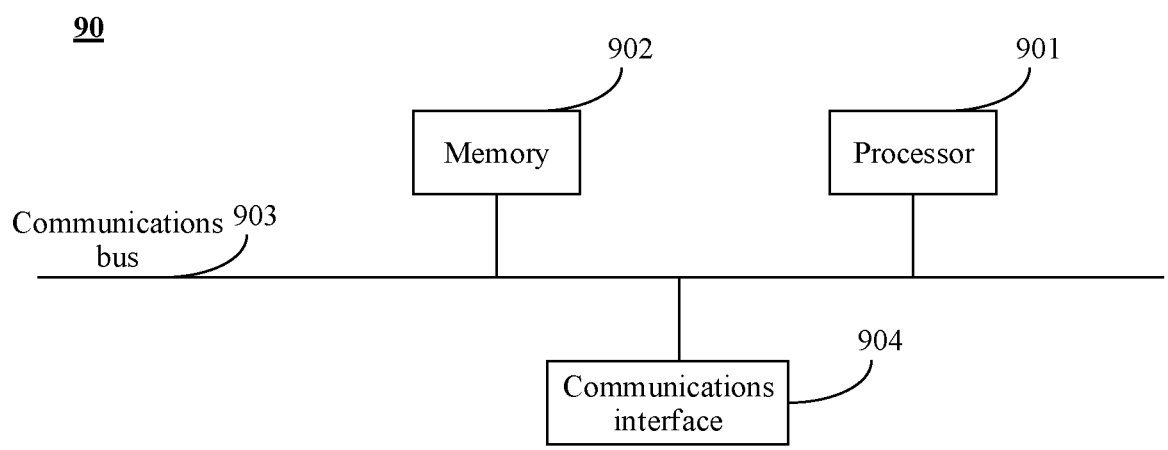
FIG. 9 is a block diagram of a routing information transmission apparatus according to an embodiment of this application.

FIG. 9 is a block diagram of a routing information transmission apparatus according to an embodiment of this application. The routing information transmission apparatus may be a DCI device. As shown in FIG. 9, an apparatus 90 includes a processor 901 and a memory 902.

The memory 902 is configured to store a computer program, where the computer program includes program instructions.

The processor 901 is configured to invoke the computer program, to implement the steps performed by the first DCI device and/or the second DCI device in the routing information transmission method shown in FIG. 2A and FIG. 2B.

Optionally, the apparatus 90 further includes a communications bus 903 and a communications interface 904.

The processor 901 includes one or more processing cores, and the processor 901 executes various function applications and data processing by running the computer program. The processor 901 may be a central processing unit (CPU), an Ethernet switch chip, a network processor (NP), or a combination of a CPU, an Ethernet switch chip, and an NP. The CPU may control the Ethernet switch chip or the NP to perform initialization, service entry delivery, protocol and packet sending and receiving, various kinds of interruption (including port link up processing and port link down processing), and the like. Optionally, a random access memory (RAM) may be externally disposed on the Ethernet switch chip, to store a forwarded packet, so as to resolve a problem that an internal cache of the Ethernet switch chip is insufficient. The Ethernet switch chip completes Ethernet interface abutment between optical interfaces or electrical interfaces of devices by using a physical layer (PHY).

The memory 902 may be configured to store the computer program. Optionally, the memory may store an operating system and an application program unit required by at least one function. The operating system may be an operating system such as a real-time operating system (e.g., Real Time executive (RTX), LINUX, UNIX, WINDOWS, or OS X. The memory includes a volatile memory, for example, a RAM; or the memory may include a non-volatile memory, for example, a flash memory, a hard disk drive (HDD), or a solid-state drive (SSD); or the memory 902 may include a combination of the foregoing types of memories. For example, the memory 902 includes a RAM and a flash memory. A program run by the processor 901 and parameters that are statically configured are stored in the flash memory, and code and data that are executed when the program is run are stored in the RAM.

There may be a plurality of communications interfaces 904, and the communications interfaces 904 are configured to communicate with another storage device or network device, for example, in an embodiment of this application, the communications interfaces 904 may be configured to send a packet carrying routing information to another device.

The memory 902 and the communications interface 904 are separately connected to the processor 901 by using the communications bus 903.

An embodiment of this application further provides a computer storage medium. The computer storage medium stores instructions. When the instructions are executed by a processor, the routing information transmission method shown in FIG. 2A and FIG. 2B is implemented.

A person of ordinary skill in the art may understand that all or some of the steps of the embodiments may be implemented by hardware or a program instructing related hardware. The program may be stored in a computer-readable storage medium. The storage medium may be non-transitory such as a read-only memory, a magnetic disk, an optical disc, or the like.

In the embodiments of this application, the terms "first", "second", and "third" are merely used for a purpose of description, and shall not be understood as an indication or implication of relative importance.

The term "and/or" in this application describes only an association relationship for describing associated objects and indicates that three relationships may exist. For example, A and/or B may indicate the following three cases such as only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, or improvement made without departing from the concept and principle of this application should fall within the protection scope of this application.

What is claimed is:

1. A routing information transmission method, comprising:
receiving, by a first data center interconnection (DCI) device in a first data center, a first packet from a border gateway protocol Ethernet virtual private network (BGP EVPN) neighbor that is of the first DCI device and that is in the first data center, wherein the first packet comprises routing information of a first forwarding instance of an access device in the first data center and an export route target of the first forwarding instance;
obtaining, by the first DCI device, a second forwarding instance that corresponds to the first packet and that is in the first DCI device, wherein an import route target of the second forwarding instance matches the export route target of the first forwarding instance;
generating, by the first DCI device, a second packet based on the first packet, wherein the second packet comprises routing information of the second forwarding instance and an export route target of the second forwarding instance, and wherein the export route target of the second forwarding instance comprises a local interworking route target;
determining a second DCI device is a second BGP EVPN neighbor of the first DCI device based on a DCI attribute that is configured at a DCI BGP EVPN of the first DCI device;
deleting the local interworking route target from the second packet; and
sending, by the first DCI device, the second packet to the second DCI device in a second data center when the export route target of the second forwarding instance comprises a DCI interworking route target, wherein the DCI interworking route target is for performing interworking between the first data center and the second data center.

2. The routing information transmission method of claim 1, wherein sending, by the first DCI device, the second packet to the second DCI device in the second data center comprises:
deleting, by the first DCI device, the local interworking route target from the second packet; and
sending, by the first DCI device, the second packet to the second DCI device after deleting the local interworking route target from the second packet.

3. The routing information transmission method of claim 1, further comprising generating, by the first DCI device, a forwarding entry of the second forwarding instance based on the routing information of the first forwarding instance.

4. The routing information transmission method of claim 1, further comprising:
receiving, by the second DCI device in the second data center, the second packet from the first DCI device in the first data center;
generating, by the second DCI device, a third packet based on the second packet when an import route target of a third forwarding instance of the second DCI device comprises the DCI interworking route target, wherein the third packet comprises routing information of the third forwarding instance and an export route target of the third forwarding instance; and sending, by the second DCI device, the third packet to a first BGP EVPN neighbor that is of the second DCI device and that is in the second data center.

5. The routing information transmission method of claim 4, wherein the routing information transmission method further comprises:
obtaining, by the second DCI device, a fourth forwarding instance in the second DCI device after receiving the second packet from the first DCI device, wherein an import route target of the fourth forwarding instance comprises the local interworking route target of the first data center;
generating, by the second DCI device, a fourth packet based on the second packet, wherein the fourth packet comprises routing information of the fourth forwarding instance and an export route target of the fourth forwarding instance; and
sending, by the second DCI device, the fourth packet to a second BGP EVPN neighbor that is of the second DCI device and that is in the second data center.

6. The routing information transmission method of claim 4, wherein the routing information transmission method further comprises:
obtaining, by the second DCI device, a fourth forwarding instance in the second DCI device after receiving the second packet from the first DCI device, wherein an import route target of the fourth forwarding instance comprises the local interworking route target of the first data center, and wherein the fourth forwarding instance is unrelated to the first packet when the import route target of the fourth forwarding instance does not comprise the DCI interworking route target.

7. The routing information transmission method of claim 4, further generating, by the second DCI device, a forwarding entry of the third forwarding instance based on the routing information of the second forwarding instance when the import route target of the third forwarding instance comprises the DCI interworking route target.

8. The routing information transmission method of claim 1, wherein the first packet further includes an extended community attribute that comprises a type number of a virtual extensible local area network (VXLAN) tunnel.

9. A routing information transmission apparatus of a first data center interconnection (DCI) device in a first data center, wherein the routing information transmission apparatus comprises:
a memory configured to store program instructions; and
one or more processors coupled to the memory, wherein the program instructions that when executed by the one or more processors cause the routing information transmission apparatus to:
receive a first packet from a border gateway protocol Ethernet virtual private network (BGP EVPN) neighbor that is of the first DCI device and that is in the first data center, wherein the first packet comprises routing information of a first forwarding instance of an access device in the first data center and an export route target of the first forwarding instance;
obtain a second forwarding instance that corresponds to the first packet and that is in the first DCI device, wherein an import route target of the second forwarding instance matches the export route target of the first forwarding instance;
generate a second packet based on the first packet, wherein the second packet comprises routing information of the second forwarding instance and an export route target of the second forwarding instance, and wherein the export route target of the second forwarding instance comprises a local interworking route target;
determine a second DCI device is a second BGP EVPN neighbor of the first DCI device based on a DCI attribute that is configured at a DCI BGP EVPN of the first DCI device;
delete the local interworking route target from the second packet; and
send the second packet to the second DCI device in a second data center when the export route target of the second forwarding instance comprises a DCI interworking route target.

10. The routing information transmission apparatus of claim 9, wherein the program instructions that when executed by the one or more processors further cause the routing information transmission apparatus to send the second packet to the second DCI device after deleting the local interworking route target from the second packet.

11. The routing information transmission apparatus of claim 9, wherein the program instructions that when executed by the one or more processors further cause the routing information transmission apparatus to generate a forwarding entry of the second forwarding instance based on the routing information of the first forwarding instance.

12. The routing information transmission apparatus of claim 9, wherein the first packet further includes an extended community attribute that comprises a type number of a virtual extensible local area network (VXLAN) tunnel.

13. A data center interconnection (DCI) network, comprising:
a second data center; and
a first data center coupled to the second data center and comprising a first DCI device, wherein the first DCI device is a Border Gateway Protocol Ethernet virtual private network (BGP EVPN) neighbor of a second DCI device, and wherein the first DCI device is configured to:
receive a first packet from a first BGP EVPN neighbor of the first DCI device and that is in the first data center, wherein the first packet comprises routing information of a first forwarding instance of an access device in the first data center and an export route target of the first forwarding instance;
obtain a second forwarding instance that corresponds to the first packet and that is in the first DCI device, wherein an import route target of the second forwarding instance matches the export route target of the first forwarding instance;
generate a second packet based on the first packet, wherein the second packet comprises routing information of the second forwarding instance and an export route target of the second forwarding instance, and wherein the export route target of the second forwarding instance comprises a local interworking route target;
determine the second DCI device is a second BGP EVPN neighbor of the first DCI device based on a DCI attribute that is configured at a DCI BGP EVPN of the first DCI device;
delete the local interworking route target from the second packet; and
send the second packet to the second DCI device in the second data center when the export route target of the second forwarding instance comprises a DCI interworking route target.

14. The DCI network of claim 13, wherein the first DCI device is further configured to generate a forwarding entry of the second forwarding instance based on the routing information of the first forwarding instance.

15. The DCI network of claim 13, wherein the second DCI device is configured to:
receive the second packet;
generate a third packet based on the second packet when an import route target of a third forwarding instance of the second DCI device comprises the DCI interworking route target, wherein the third packet comprises routing information of the third forwarding instance and an export route target of the third forwarding instance; and
send the third packet to a first BGP EVPN neighbor that is of the second DCI device and that is in the second data center.

16. The DCI network of claim 15, wherein the second DCI device is further configured to:
obtain a fourth forwarding instance in the second DCI device, wherein an import route target of the fourth forwarding instance comprises the local interworking route target of the first data center;
generate a fourth packet based on the second packet, wherein the fourth packet comprises routing information of the fourth forwarding instance and an export route target of the fourth forwarding instance; and
send the fourth packet to a second BGP EVPN neighbor that is of the second DCI device and that is in the second data center.

17. The DCI network of claim 15, wherein the second DCI device is further configured to:
obtain a fourth forwarding instance in the second DCI device, wherein an import route target of the fourth forwarding instance comprises the local interworking route target of the first data center, and wherein the fourth forwarding instance is unrelated to the first packet when the import route target of the fourth forwarding instance does not comprise the DCI interworking route target.

18. The DCI network of claim 15, wherein the second DCI device is further configured to generate a forwarding entry of the third forwarding instance based on the routing information of the second forwarding instance when the import route target of the third forwarding instance of the second DCI device comprises the DCI interworking route target.

19. The DCI network of claim 13, wherein the first packet further includes an extended community attribute that comprises a type number of a virtual extensible local area network (VXLAN) tunnel.

20. The DCI network of claim 13, wherein the first DCI device is further configured to modify a next hop in the first packet as a VTEP address of the first DCI device to obtain the second packet.

* * * * *